(12) United States Patent
Banholzer et al.

(10) Patent No.: US 12,064,861 B2
(45) Date of Patent: *Aug. 20, 2024

(54) TELESCOPING TOOL WITH COLLAPSIBLE BEARING ASSEMBLY

(71) Applicant: MILWAUKEE ELECTRIC TOOL CORPORATION, Brookfield, WI (US)

(72) Inventors: Hans T. Banholzer, Milwaukee, WI (US); Troy C. Thorson, Cedarburg, WI (US); Michael R. Sande, Waukesha, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/194,878

(22) Filed: Apr. 3, 2023

(65) Prior Publication Data

US 2023/0249332 A1    Aug. 10, 2023

Related U.S. Application Data

(63) Continuation of application No. 16/858,061, filed on Apr. 24, 2020, now Pat. No. 11,618,149.

(Continued)

(51) Int. Cl.
*B25F 5/02* (2006.01)
*B23D 57/00* (2006.01)
(Continued)

(52) U.S. Cl.
CPC ................ *B25F 5/02* (2013.01); *F16C 19/10* (2013.01); *B23D 57/0092* (2013.01); *B23D 57/023* (2013.01)

(58) Field of Classification Search
CPC ........ B25F 5/02; F16C 19/10; B23D 57/0092; B23D 57/023
See application file for complete search history.

(56) References Cited

U.S. PATENT DOCUMENTS 2,611,512 A    9/1952    Alexander
3,476,960 A    11/1969   Rees
(Continued)

FOREIGN PATENT DOCUMENTS

AU    2017101789 A4    2/2018
CN      2900911 Y      5/2007
(Continued)

*Primary Examiner* — Lucas E. A. Palmer
(74) *Attorney, Agent, or Firm* — Michael Best & Friedrich LLP

(57) ABSTRACT

A telescoping tool includes a pole assembly, a driveshaft, a plurality of bearings, and at least one connection member. The pole assembly includes an outer pole and an inner pole. The inner pole is slidably received in the outer pole. The pole assembly is movable between a retracted configuration and an extended configuration. The driveshaft extends longitudinally in the outer pole and the inner pole. Each bearing of the plurality of bearings includes a driveshaft passage defined therein. The driveshaft passage receives the driveshaft therethrough. Each bearing further includes an end connection passage defined therein. The at least one connection member joins adjacent bearings of the plurality of bearings. The at least one connection member is disposed in the end connection passage of each of the adjacent bearings.

20 Claims, 14 Drawing Sheets

US 12,064,861 B2

Page 2

Related U.S. Application Data

(60) Provisional application No. 62/862,183, filed on Jun. 17, 2019, provisional application No. 62/839,353, filed on Apr. 26, 2019.

(51) Int. Cl.
  *B23D 57/02* (2006.01)
  *F16C 19/10* (2006.01)

(56) References Cited

U.S. PATENT DOCUMENTS

| | | |
|---|---|---|
| 3,604,573 A | 9/1971 | Leitch |
| 3,617,034 A | 11/1971 | Skinner |
| 3,625,292 A | 12/1971 | Lay |
| 3,639,789 A | 2/1972 | Bednarski |
| 3,640,573 A * | 2/1972 | Safar ............... F16C 19/545 299/60 |
| 3,657,813 A * | 4/1972 | Knight .................. A01G 3/08 30/296.1 |
| 3,737,987 A | 6/1973 | Bednarski |
| 3,737,988 A | 6/1973 | Bednarski |
| 3,747,800 A | 7/1973 | Viland |
| 3,750,730 A | 8/1973 | Dorsch |
| 3,779,420 A | 12/1973 | Knaus |
| 3,838,795 A | 10/1974 | Berg |
| 3,845,841 A | 11/1974 | Kloefkorn |
| 3,865,213 A | 2/1975 | McDermott |
| 3,917,117 A | 11/1975 | Plotsky |
| 3,968,896 A | 7/1976 | Giacoletti et al. |
| 3,983,857 A | 10/1976 | O'Connor |
| 4,062,156 A * | 12/1977 | Roth ..................... F16B 7/105 343/903 |
| 4,135,562 A | 1/1979 | Martineau et al. |
| 4,142,756 A | 3/1979 | Henning et al. |
| 4,168,012 A | 9/1979 | Hawkinson |
| 4,168,687 A | 9/1979 | Kurahashi et al. |
| 4,172,573 A | 10/1979 | Moore et al. |
| 4,178,894 A | 12/1979 | Nau |
| 4,337,873 A | 7/1982 | Johnson |
| 4,353,163 A | 10/1982 | Overbury et al. |
| 4,360,124 A | 11/1982 | Knaus et al. |
| 4,463,498 A | 8/1984 | Everts |
| 4,505,040 A | 3/1985 | Everts |
| 4,614,128 A * | 9/1986 | Fickler ............... F16H 25/2018 74/89.31 |
| 4,616,128 A | 10/1986 | Case |
| 4,644,658 A | 2/1987 | Dolata et al. |
| 4,654,971 A * | 4/1987 | Fettes ............... B27B 17/0008 30/296.1 |
| 4,676,463 A | 6/1987 | Tansill |
| 4,733,471 A | 3/1988 | Rahe |
| 4,750,518 A | 6/1988 | Griffin et al. |
| 4,793,197 A * | 12/1988 | Petrovsky ............... F16H 25/20 248/161 |
| 4,794,273 A | 12/1988 | McCullough et al. |
| 4,833,973 A | 5/1989 | Wang |
| 4,899,446 A | 2/1990 | Akiba et al. |
| 4,916,818 A | 4/1990 | Panek |
| 4,924,573 A | 5/1990 | Huddleston et al. |
| 4,928,390 A | 5/1990 | Gassen et al. |
| 4,948,070 A | 8/1990 | Lyman |
| 4,991,298 A | 2/1991 | Matre |
| 5,013,282 A * | 5/1991 | Keller ..................... B27B 17/08 464/178 |
| 5,163,650 A * | 11/1992 | Adams ................... E04H 12/182 248/405 |
| 5,269,733 A | 12/1993 | Anthony, III |
| 5,615,855 A * | 4/1997 | Marue .................... B60P 3/18 52/118 |
| 5,662,428 A | 9/1997 | Wilson |
| 5,718,050 A | 2/1998 | Keller et al. |
| 5,819,418 A * | 10/1998 | Uhl ......................... A01G 3/08 30/296.1 |
| 5,913,451 A | 6/1999 | Madison |
| 5,926,961 A * | 7/1999 | Uhl .................... B27B 17/0008 30/296.1 |
| 5,933,966 A | 8/1999 | Yates et al. |
| 6,111,187 A | 8/2000 | Goyette |
| 6,155,448 A | 12/2000 | Ishikawa et al. |
| 6,182,367 B1 | 2/2001 | Janczak |
| 6,722,041 B2 | 4/2004 | Warashina et al. |
| 6,739,058 B2 | 5/2004 | Warashina et al. |
| 6,754,963 B2 | 6/2004 | Warashina et al. |
| 6,880,248 B2 | 4/2005 | Weissert et al. |
| 7,296,600 B2 | 11/2007 | Ferreria et al. |
| 7,449,810 B2 | 11/2008 | Yokota et al. |
| 7,913,403 B1 | 3/2011 | Willetts |
| 8,136,254 B2 | 3/2012 | Gieske et al. |
| 8,191,268 B2 | 6/2012 | Willetts |
| 8,253,285 B2 | 8/2012 | Yoshida et al. |
| 8,541,913 B2 | 9/2013 | Yoshida et al. |
| 8,574,037 B2 | 11/2013 | Kresge |
| 8,672,162 B2 | 3/2014 | Okouchi |
| 8,769,829 B2 | 7/2014 | Pellenc |
| 8,882,166 B2 | 11/2014 | Ramsey et al. |
| 9,009,920 B1 | 4/2015 | Ramsey et al. |
| 9,009,921 B1 | 4/2015 | Ramsey et al. |
| 9,220,201 B2 | 12/2015 | Kratzig et al. |
| 9,309,844 B2 | 4/2016 | McLain |
| 9,391,491 B2 | 7/2016 | Yoshida et al. |
| 9,475,184 B2 * | 10/2016 | Balestrieri ............... B25G 1/04 |
| 9,591,809 B2 | 3/2017 | Gieske et al. |
| 9,630,489 B2 | 4/2017 | Shimokawa |
| 9,876,201 B2 | 1/2018 | Ishikawa et al. |
| 9,897,135 B2 * | 2/2018 | Miyakawa ............... A01D 34/90 |
| 10,188,044 B1 * | 1/2019 | Blackburn, Jr. ........ B23D 49/16 |
| 10,302,142 B2 | 5/2019 | Densborn et al. |
| 11,051,458 B2 * | 7/2021 | Wilson ................... A01G 3/085 |
| 11,130,400 B2 | 9/2021 | Esser |
| 11,618,149 B2 * | 4/2023 | Banholzer ............... B23D 51/00 173/217 |
| 2001/0032624 A1 | 10/2001 | Perry |
| 2002/0036204 A1 | 3/2002 | Miura et al. |
| 2003/0199327 A1 * | 10/2003 | Sasaki .................... F16F 15/10 464/170 |
| 2003/0229993 A1 | 12/2003 | Agne |
| 2005/0023236 A1 | 2/2005 | Adams et al. |
| 2006/0157117 A1 | 7/2006 | Scott |
| 2006/0201076 A1 * | 9/2006 | Blackwelder ......... E04H 12/182 52/118 |
| 2007/0051740 A1 | 3/2007 | Huang |
| 2007/0199957 A1 | 8/2007 | Wu et al. |
| 2008/0236124 A1 * | 10/2008 | Heinzelmann ......... A01D 34/90 30/276 |
| 2011/0162214 A1 | 7/2011 | Codeluppi |
| 2013/0048639 A1 | 2/2013 | Wiese et al. |
| 2014/0069240 A1 * | 3/2014 | Dauvin ............... B25B 23/0028 464/111 |
| 2015/0336288 A1 | 11/2015 | Hallendorff et al. |
| 2016/0238082 A1 | 8/2016 | Densborn et al. |
| 2016/0318171 A1 | 11/2016 | Gonzales |
| 2017/0002860 A1 * | 1/2017 | Davis ................... A01D 34/905 |
| 2017/0002861 A1 * | 1/2017 | Davis ................... A01D 34/905 |
| 2017/0079215 A1 | 3/2017 | Bian et al. |
| 2017/0232601 A1 | 8/2017 | Gieske et al. |
| 2017/0295721 A1 | 10/2017 | Carl |
| 2018/0119726 A1 * | 5/2018 | Weissert ................... F16L 3/06 |
| 2018/0147712 A1 | 5/2018 | Hita |
| 2018/0177135 A1 | 6/2018 | Fu |
| 2018/0184568 A1 | 7/2018 | Martin |
| 2018/0186027 A1 | 7/2018 | McRoberts et al. |
| 2020/0047610 A1 | 2/2020 | Freytag et al. |
| 2023/0355206 A1 * | 11/2023 | Butler .................. A61B 5/0066 |

FOREIGN PATENT DOCUMENTS

| | | |
|---|---|---|
| CN | 101006763 A | 8/2007 |
| CN | 201044581 Y | 4/2008 |
| CN | 201579743 U | 9/2010 |
| CN | 102079073 A | 6/2011 |
| CN | 201913627 U | 8/2011 |
| CN | 202524761 U | 11/2012 |

(56) References Cited

FOREIGN PATENT DOCUMENTS

| | | | |
|---|---|---|---|
| CN | 104675439 | A | 6/2015 |
| CN | 105453911 | A | 4/2016 |
| CN | 105881462 | A | 8/2016 |
| CN | 205454778 | U | 8/2016 |
| CN | 106900386 | A | 6/2017 |
| CN | 108142138 | A | 6/2018 |
| DE | 2413974 | A1 | 9/1974 |
| DE | 3213185 | A1 | 10/1983 |
| DE | 10313372 | A1 | 10/2004 |
| DE | 10313675 | A1 | 10/2004 |
| DE | 102012203221 | A1 | 9/2013 |
| EP | 0192469 | A2 | 8/1986 |
| EP | 3162519 | A1 | 5/2017 |
| GB | 1180289 | A | 2/1970 |
| WO | 2013097778 | A1 | 7/2013 |
| WO | 2016056884 | A1 | 4/2016 |
| WO | 2016184959 | A1 | 11/2016 |
| WO | 2018204468 | A1 | 11/2018 |

\* cited by examiner

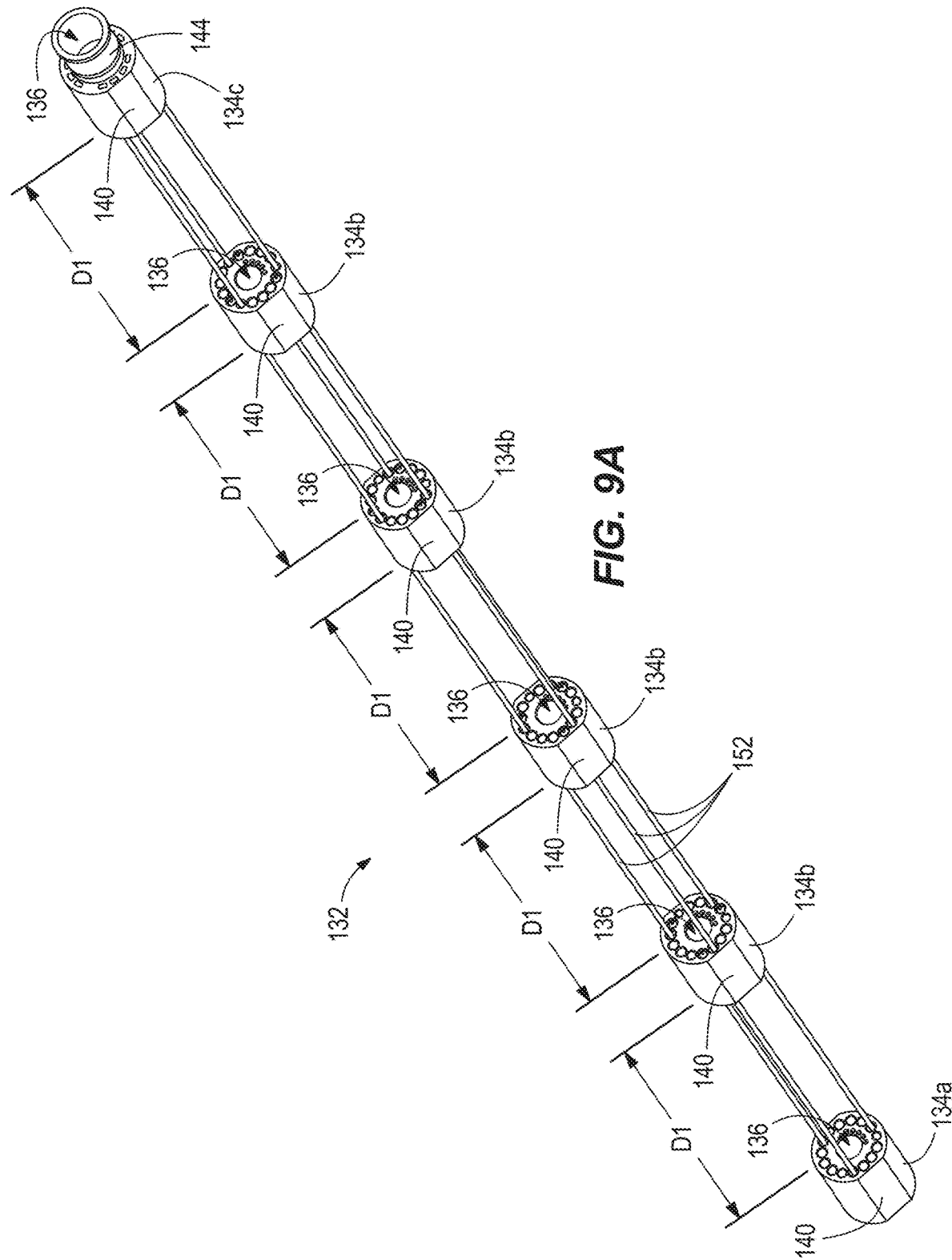

TELESCOPING TOOL WITH COLLAPSIBLE BEARING ASSEMBLY

CROSS-REFERENCE TO RELATED APPLICATIONS

This application claims priority to co-pending U.S. patent application Ser. No. 16/858,061, filed Apr. 24, 2020, which claims priority to U.S. Provisional Patent Application No. 62/862,183, filed Jun. 17, 2019, and to U.S. Provisional Patent Application No. 62/839,353, filed Apr. 26, 2019, the entire contents of all of which are incorporated by reference herein.

BACKGROUND

The present disclosure relates to a telescoping tool, and more particularly to a telescoping pole saw.

Telescoping pole saws can have several bearings along the shaft that must move as the pole assembly collapses and extends. These pole saws use metal coil springs between the bearings. The metal coil springs are compressed when the pole assembly is collapsed, and the metal coil springs are allowed to elongate when the pole assembly is extended.

SUMMARY

The disclosure provides, in one aspect, a telescoping tool. The telescoping tool includes a pole assembly, a driveshaft, a plurality of bearings, and at least one connection member. The pole assembly includes an outer pole and an inner pole. The inner pole is slidably received in the outer pole. The pole assembly is movable between a retracted configuration and an extended configuration. The driveshaft extends longitudinally in the outer pole and the inner pole. Each bearing of the plurality of bearings includes a driveshaft passage defined therein. The driveshaft passage receives the driveshaft therethrough. Each bearing further includes an end connection passage defined therein. The at least one connection member joins adjacent bearings of the plurality of bearings. The at least one connection member is disposed in the end connection passage of each of the adjacent bearings.

The disclosure also provides, in one aspect, a bearing assembly for use with a telescoping tool. The bearing assembly includes a plurality of bearings and a plurality of connection members. Each bearing of the plurality of bearings includes a driveshaft passage defined therein, an end connection passage defined therein, and a transit passage defined therein. Each connection member of the plurality of connection members slidably joins two adjacent bearings. The transit passage of each bearing allows one of the connection members to pass therethrough. The end connection passage of each bearing is configured such that a portion of one of the connection members catches on the bearing to prevent the respective connection member from being removed from the bearing.

Other features and aspects of the disclosure will become apparent by consideration of the following detailed description and accompanying drawings.

BRIEF DESCRIPTION OF THE DRAWINGS

FIG. 9A is a perspective view of a bearing assembly of the pole saw of FIG. 1 in the extended configuration.

Before any embodiments of the disclosure are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
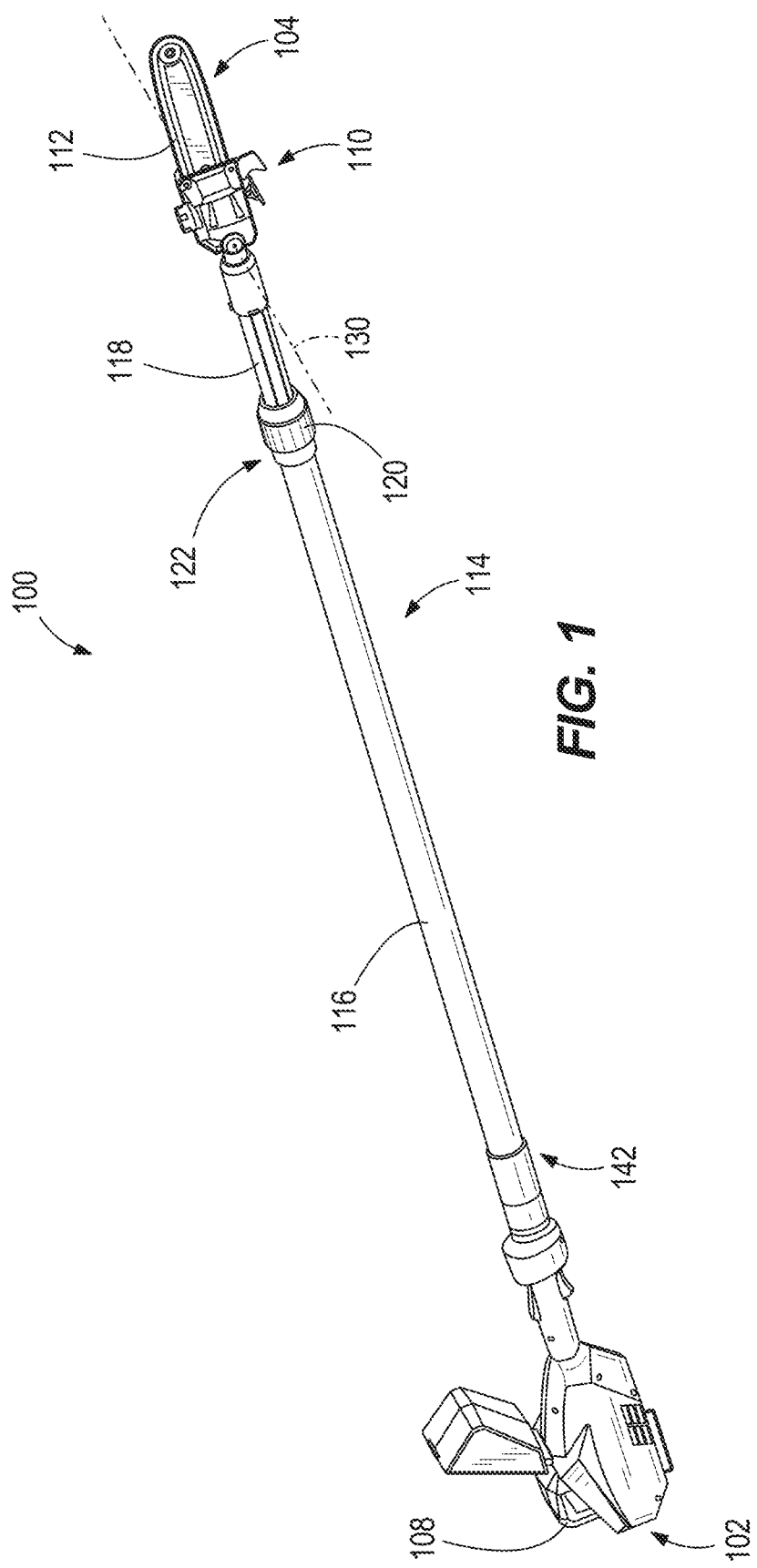
FIG. 1 is a perspective view of a telescoping pole saw in a retracted configuration according to an embodiment disclosed herein.
Figure 3:
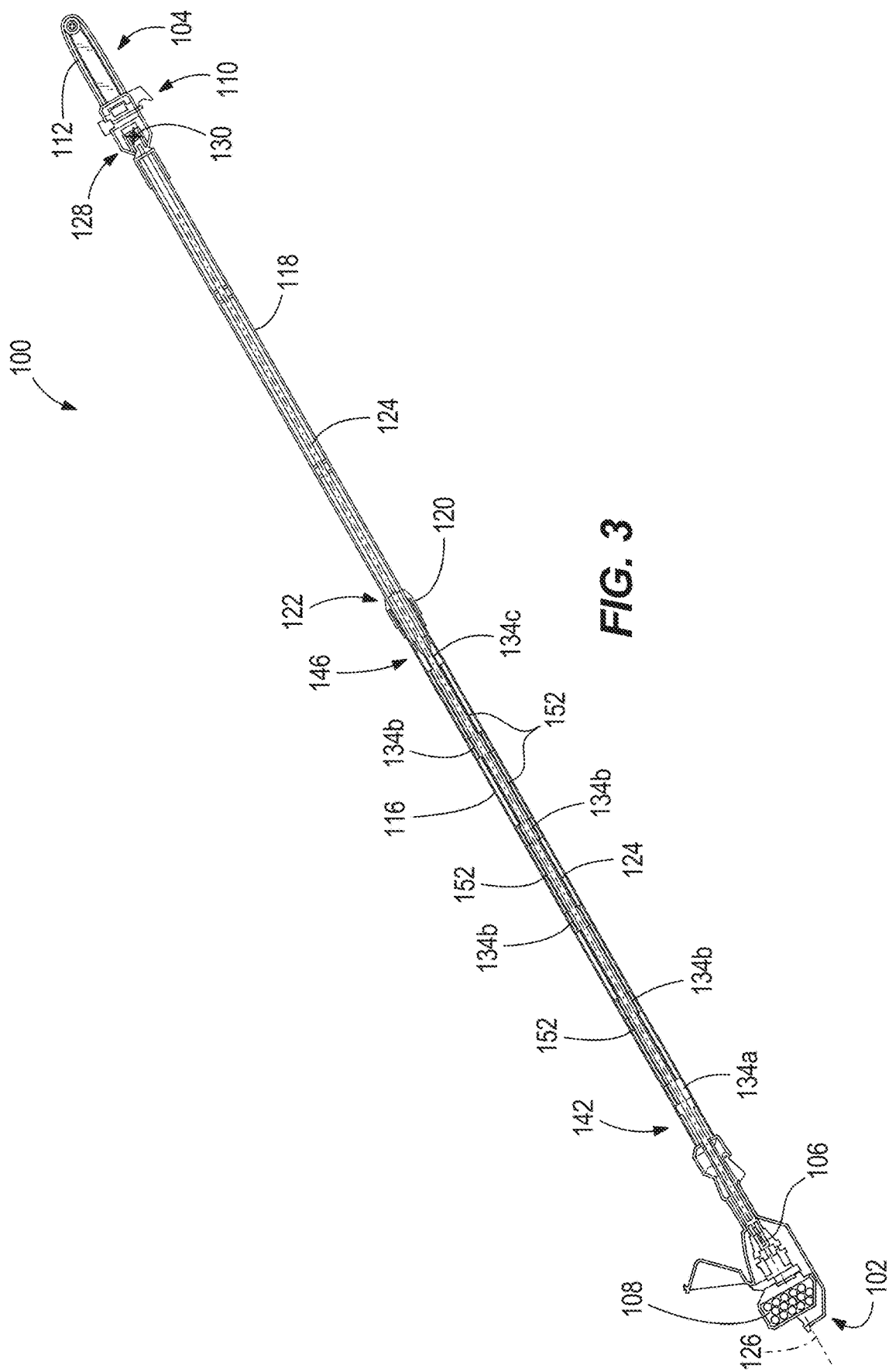
FIG. 3 is a cross-sectional perspective view of the pole saw of FIG. 1 in the extended configuration.

FIG. 1 illustrates a telescoping tool (e.g., a telescoping pole saw) 100 according to an embodiment of the present disclosure. The telescoping tool 100 includes a user engagement end 102 and a tool head end 104 opposite the user engagement end 102. As shown in FIG. 3, a drive source (e.g., an electric motor or a liquid fuel powered engine) 106 is disposed adjacent the user engagement end 102. In the illustrated embodiment, the drive source 106 is an electric motor. A battery 108 is also disposed adjacent the user engagement end 102, and the battery 108 powers the electric motor 106.

A tool head 110 is disposed adjacent the tool head end 104 of the telescoping tool 100. In the illustrated embodiment, the tool head 110 includes a saw 112. The saw 112 can be a chainsaw (as illustrated), a reciprocating saw, a circular saw, or the like.

Figure 2:
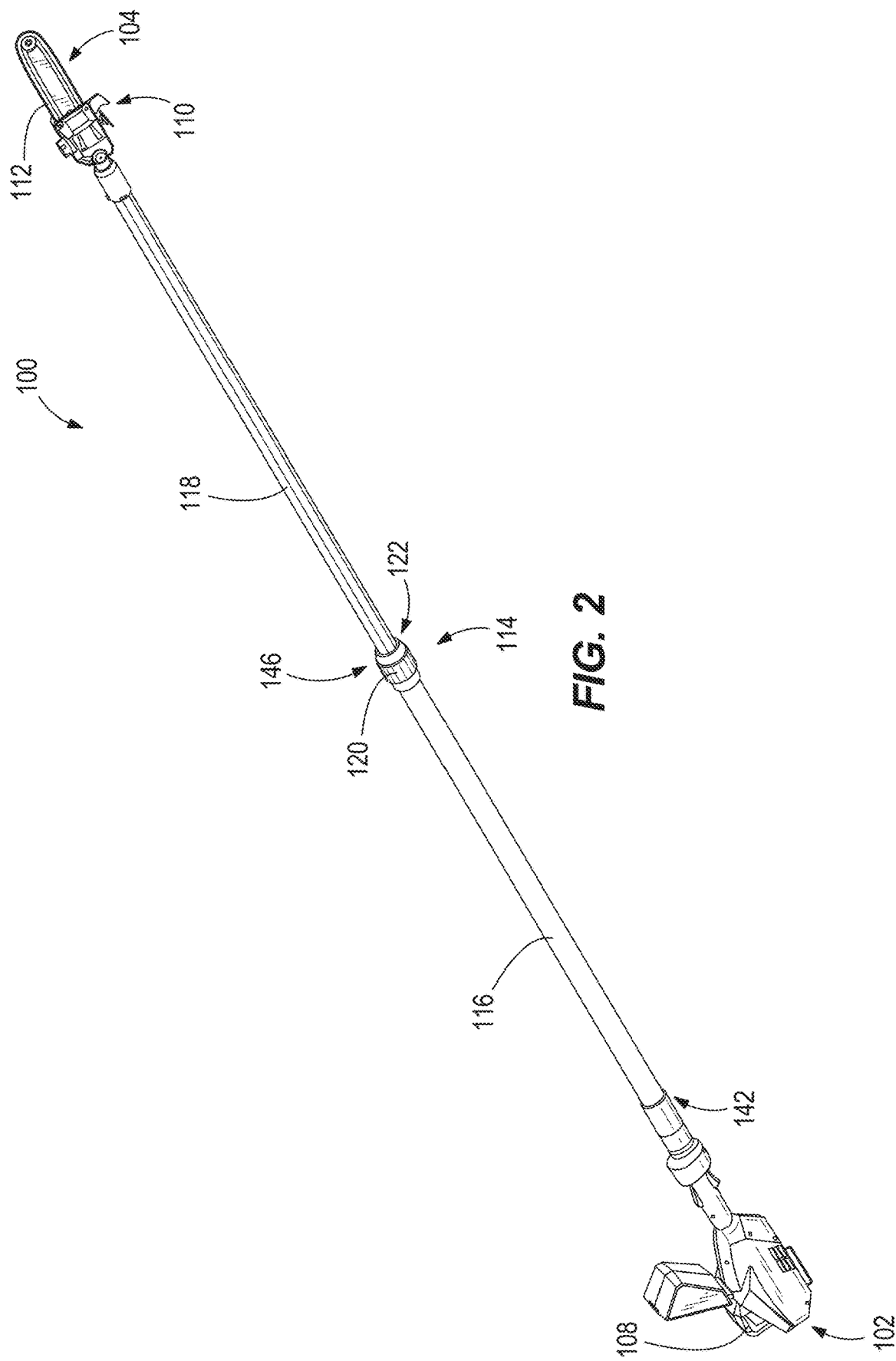
FIG. 2 is a perspective view of the pole saw of FIG. 1 in an extended configuration.

With reference to FIGS. 1 and 2, the telescoping tool 100 further includes a telescoping pole assembly 114. The pole assembly 114 includes an outer pole 116 and an inner pole 118. The inner pole 118 is slidably received in the outer pole 116. The pole assembly 114 is movable between a retracted or collapsed configuration (FIG. 1) and an extended configuration (FIG. 2). The pole assembly 114 is also positionable in a variety of intermediate configurations between the retracted configuration and the extended configuration. The telescoping pole assembly 114 is adjustable and may be locked at any given position with, for instance, a locking collar 120 disposed at a distal end 122 of the outer pole 116. The locking collar 120, when locked (e.g., threadingly tightened), secures the inner pole 118 relative to the outer pole 116. In some embodiments, the telescoping pole assembly 114 is an electrically insulative pole assembly, or a dielectric pole assembly, 114. The electrically insulative pole assembly 114 includes the inner pole 118 and the outer pole 116 made of an electrically insulative material, such as fiberglass and resin, a plastic or other polymer, or the like.

With reference to FIG. 3, a driveshaft 124 is disposed in the outer pole 116 and the inner pole 118 and is driven by the motor 106. The driveshaft 124 is rotatable about a longitudinal axis 126 of the telescoping tool 100. The driveshaft 124 is illustrated as a telescoping driveshaft. In some embodiments, the driveshaft 124 is an electrically insulative driveshaft, or a dielectric driveshaft, 124. The electrically insulative driveshaft 124 is made of an electrically insulative material, such as fiberglass and resin, a plastic or other polymer, or the like.

In the illustrated embodiment, the tool head 110 includes a transmission (e.g., a gear assembly) 128 that transfers the forces from the driveshaft 124 to the saw 112. In the illustrated embodiment, the transmission 128 transfers the rotational motion of the driveshaft 124 rotating about the longitudinal axis 126 into rotational motion of the saw 112 about one or more sprocket axes 130 that are perpendicular to the longitudinal axis 126. Other embodiments may include the transmission 128 transferring the rotational motion of the driveshaft 124 into a reciprocating linear motion of the saw 112 or into a rotational motion of the saw 112 about a blade axis.

A bearing assembly 132 (as shown in FIGS. 9A-9F) is disposed inside the outer pole 116 of the telescoping pole assembly 114 (as shown in FIG. 3). The bearing assembly 132 includes a plurality of bearings 134a, 134b, 134c that are disposed between the driveshaft 124 and the outer pole 116 in a radial direction relative to the longitudinal axis 126. The bearings 134a, 134b, 134c maintain the driveshaft 124 in a centered position relative to the outer pole 116 and facilitate rotation of the driveshaft 124 relative to the outer pole 116. The driveshaft 124 is configured to rotate relative to at least a portion of the bearings 134a, 134b, 134c. This rotation may be facilitated by the choice of material for the bearings 134a, 134b, 134c, a lubricant (e.g., grease, oil, or the like), moving parts of the bearings 134a, 134b, 134c, some combination thereof, or the like. Each bearing 134a, 134b, 134c includes a driveshaft passage 136 defined therein, through which the driveshaft 124 extends.

Figure 6:
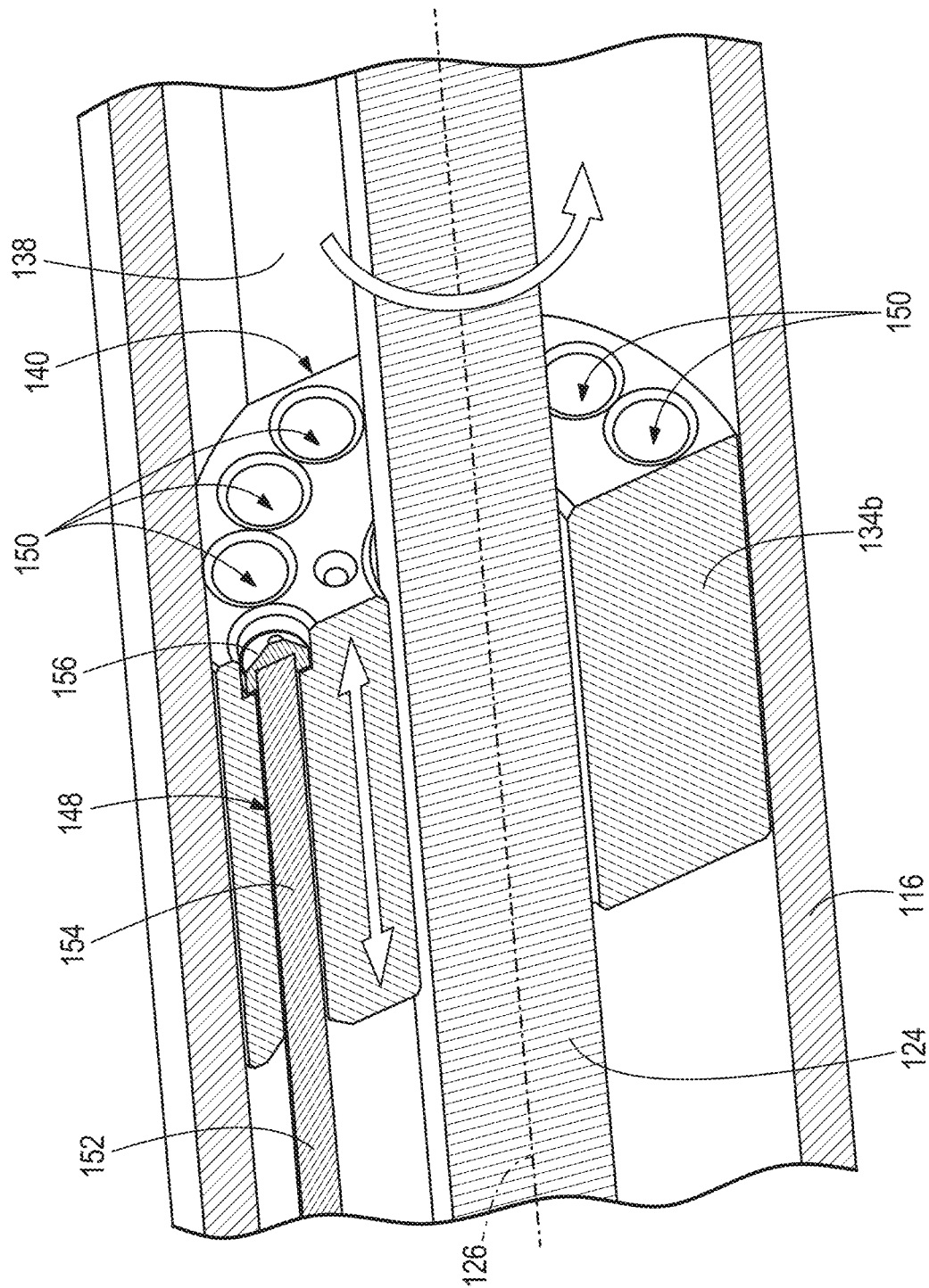
FIG. 6 is a detailed cross-sectional perspective view of the pole saw of FIG. 1 in the extended configuration.
Figure 8:
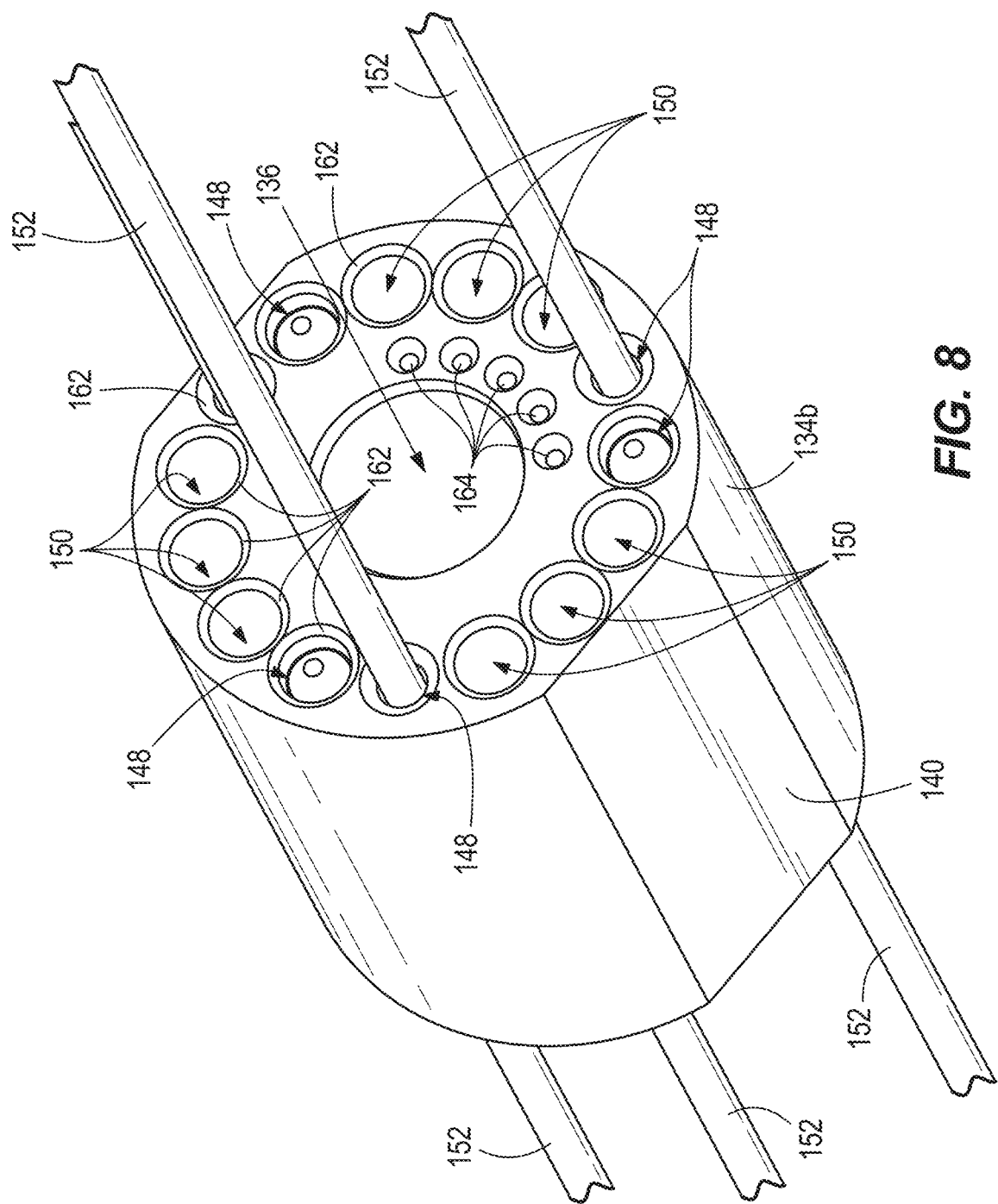
FIG. 8 is a perspective view of a bearing of the pole saw of FIG. 1 according to an embodiment disclosed herein.
Figure 9B:
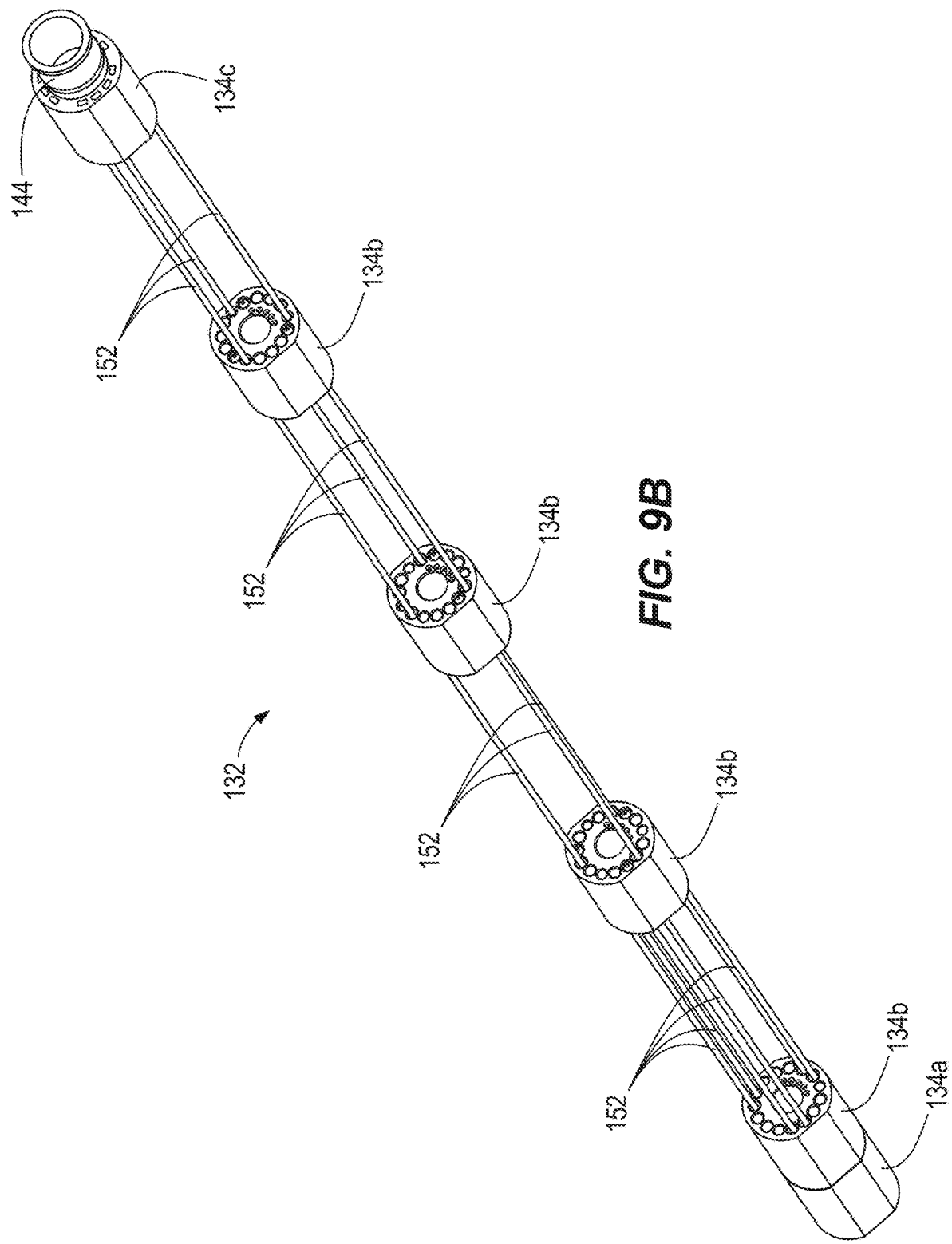
FIG. 9B is a perspective view of the bearing assembly of FIG. 9A in an intermediate configuration.
Figure 9C:
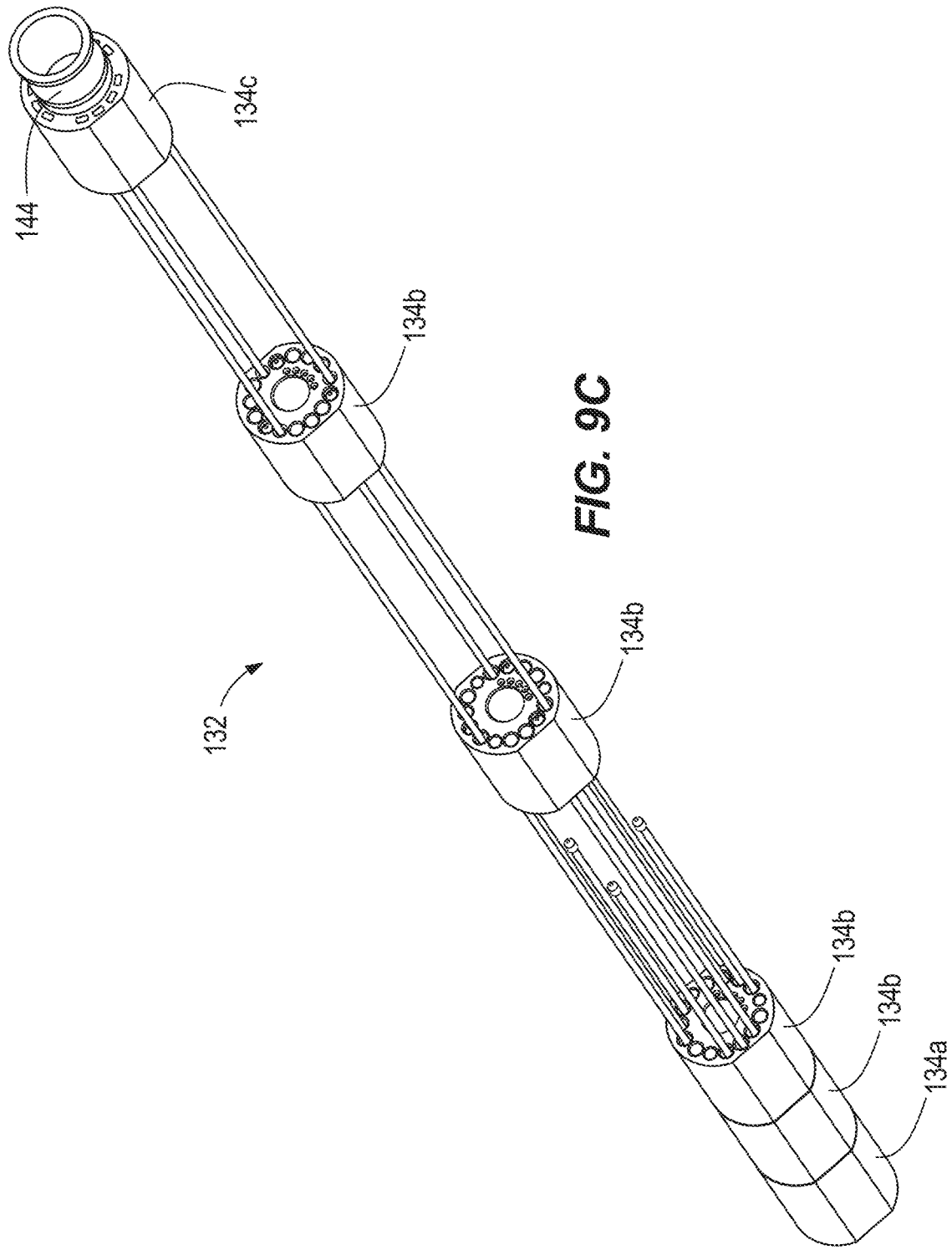
FIG. 9C is a perspective view of the bearing assembly of FIG. 9A in an intermediate configuration.
Figure 9D:
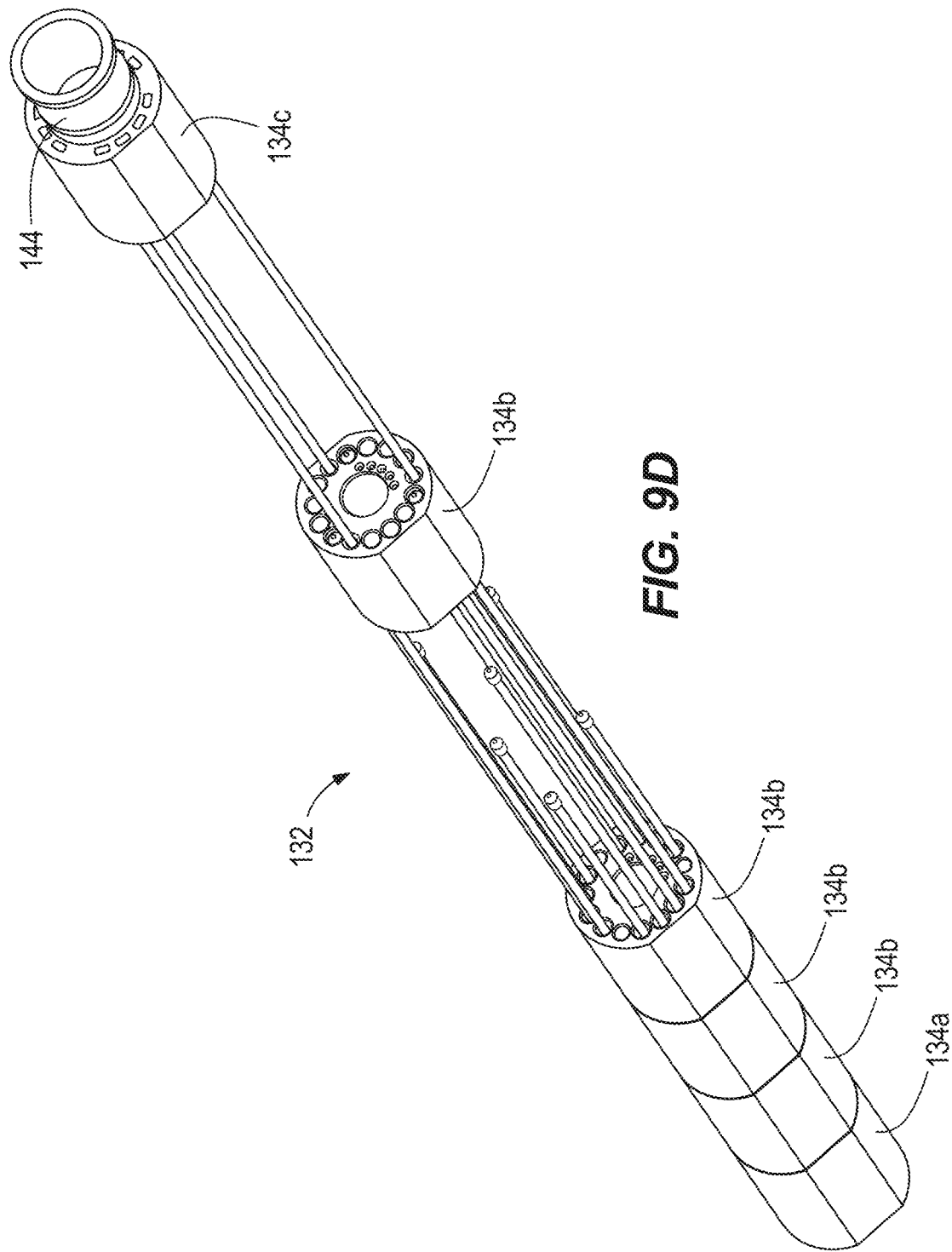
FIG. 9D is a perspective view of the bearing assembly of FIG. 9A in an intermediate configuration.
Figure 9E:
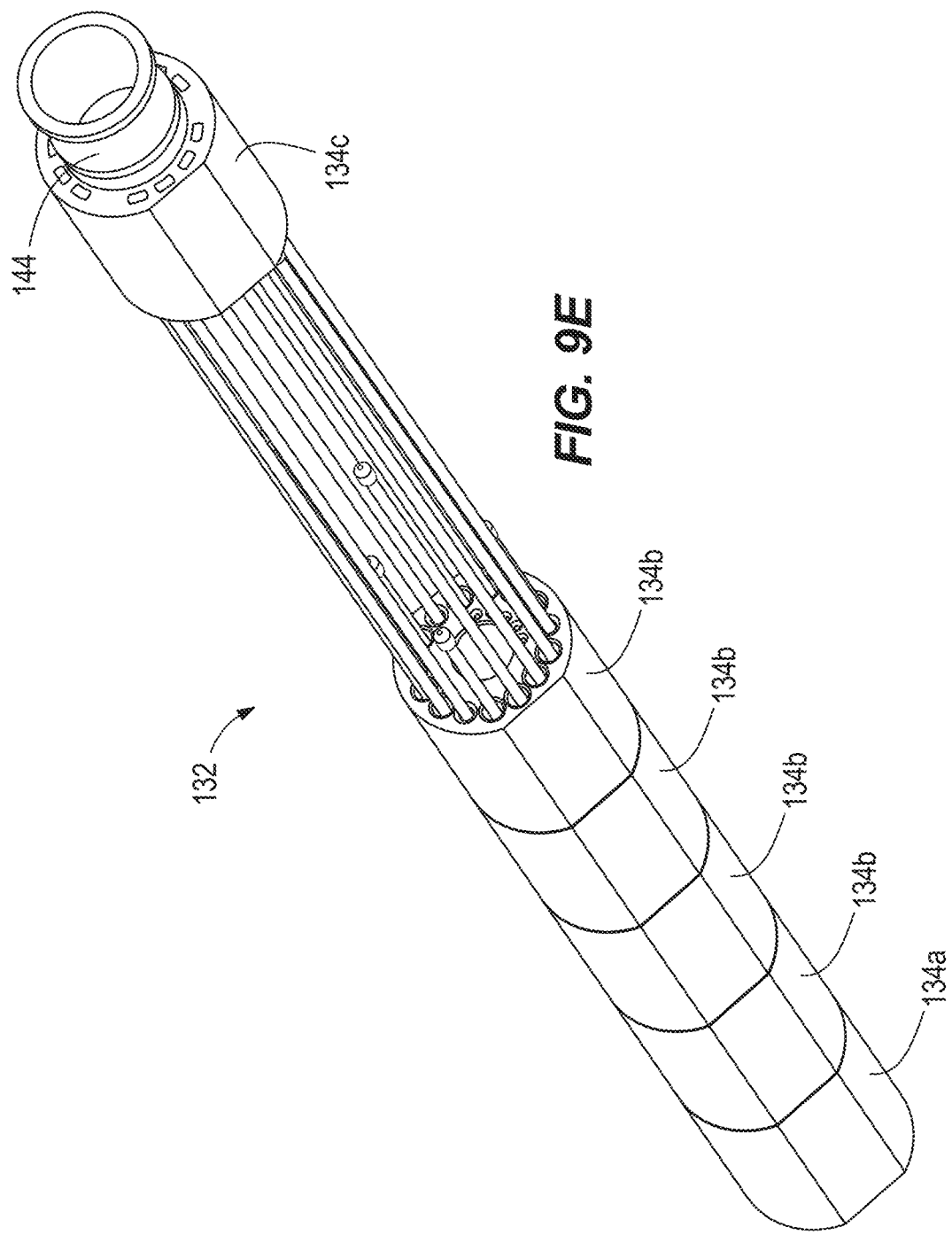
FIG. 9E is a perspective view of the bearing assembly of FIG. 9A in an intermediate configuration.
Figure 9F:
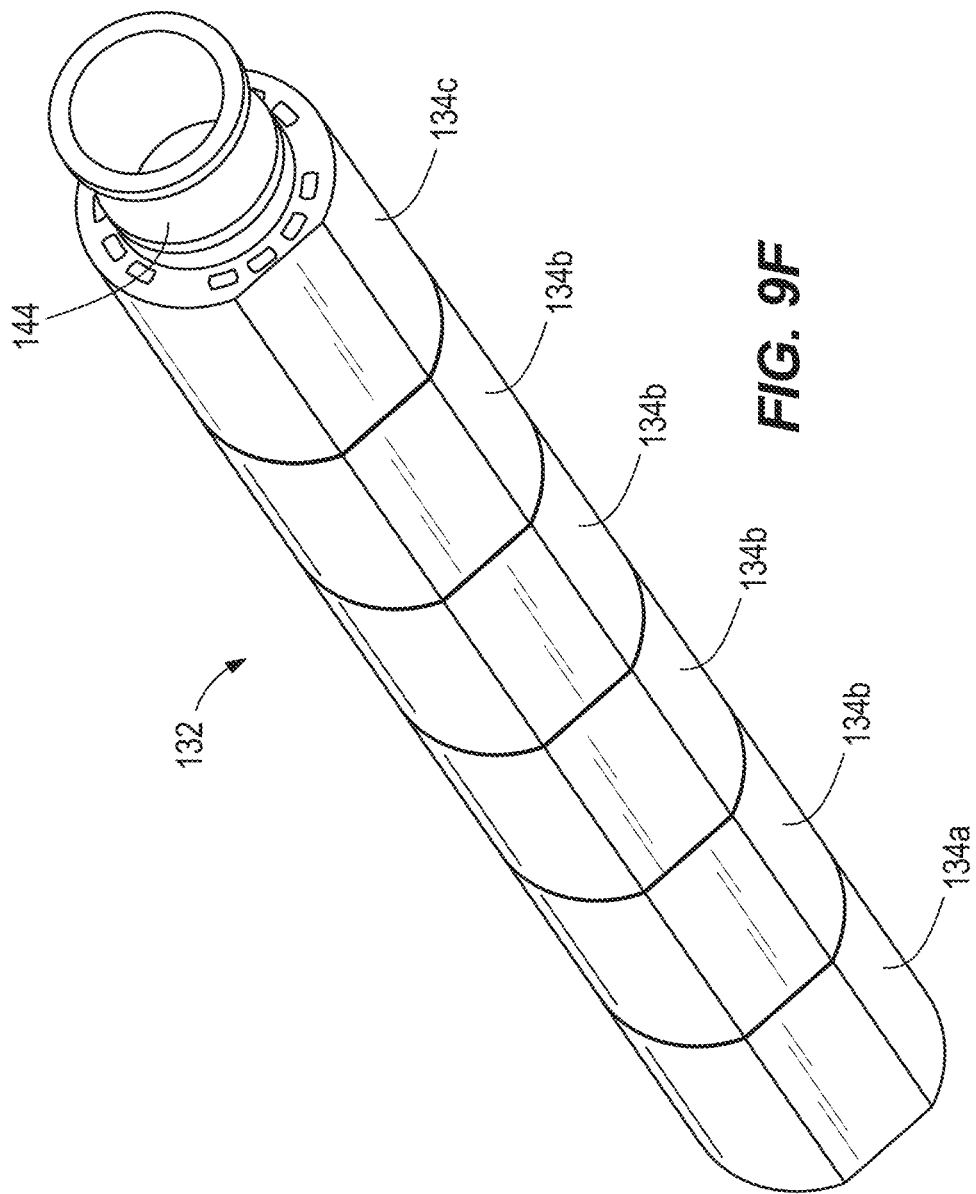
FIG. 9F is a perspective view of the bearing assembly of FIG. 9A in the retracted configuration.

As shown in FIG. 8, in the illustrated embodiment, each bearing 134a, 134b, 134c is a bushing made as a single unitary part. Other types of bearings, including ball bearing assemblies, are contemplated herein. The illustrated bearings 134a, 134b, 134c are configured to remain rotationally fixed relative to the outer pole 116. The bearings 134a, 134b, 134c closely follow the contours of the outer pole 116 in the illustrated embodiment (as shown in FIG. 6). The outer pole 116 includes at least one flat section 138, and the bearings 134a, 134b, 134c include a corresponding flat section 140 positioned adjacent thereto. Other embodiments may include a male protrusion on one of the outer pole 116 and a respective bearing 134a, 134b, 134c mating with a female receiving area on the other of the outer pole 116 and the respective bearing 134a, 134b, 134c. In some embodiments, the bearings 134a, 134b, 134c are electrically insulative bearings, or dielectric bearings, 134a, 134b, 134c. The bearings 134a, 134b, 134c are made of an electrically insulative material, such as fiberglass and resin, a plastic or other polymer, or the like.

The bearings 134a, 134b, 134c are also slidable along the longitudinal axis 126 relative to both the driveshaft 124 and the outer pole 116 to allow the telescoping pole assembly 114 to telescope. In the extended configuration (FIG. 2), the bearings 134a, 134b, 134c of the bearing assembly 132 are spaced apart from each other by a greater spacing distance D1 (shown in FIGS. 5 and 9A) than in the retracted configuration (FIG. 1) of the telescoping tool 100. In the illustrated embodiment, the retracted configuration of the telescoping tool 100 (FIG. 1) includes adjacent bearings 134a, 134b, 134c contacting each other (shown in FIG. 9F). Other embodiments may include a relatively small spacing distance between adjacent bearings 134a, 134b, 134c in the retracted configuration of the telescoping tool 100.

In the illustrated embodiment (referring particularly to FIG. 9A), the bearing assembly 132 includes end bearings 134a, 134c and intermediate bearings 134b disposed between the end bearings 134a, 134c. The end bearings 134a, 134c include a proximal end bearing 134a and a distal end bearing 134c. In some embodiments, the proximal end bearing 134a is fixed to the outer pole 116 at, for instance, a position adjacent a proximal end 142 of the outer pole 116. In the illustrated embodiment, the distal end bearing 134c includes an inner pole connection portion 144 that is connected to the inner pole 118 such that the distal end bearing 134c moves along the longitudinal axis 126 with the inner pole 118. The inner pole connection portion 144 is illustrated as a protruding collar that is received in a proximal end 146 of the inner pole 118.

Figure 4:
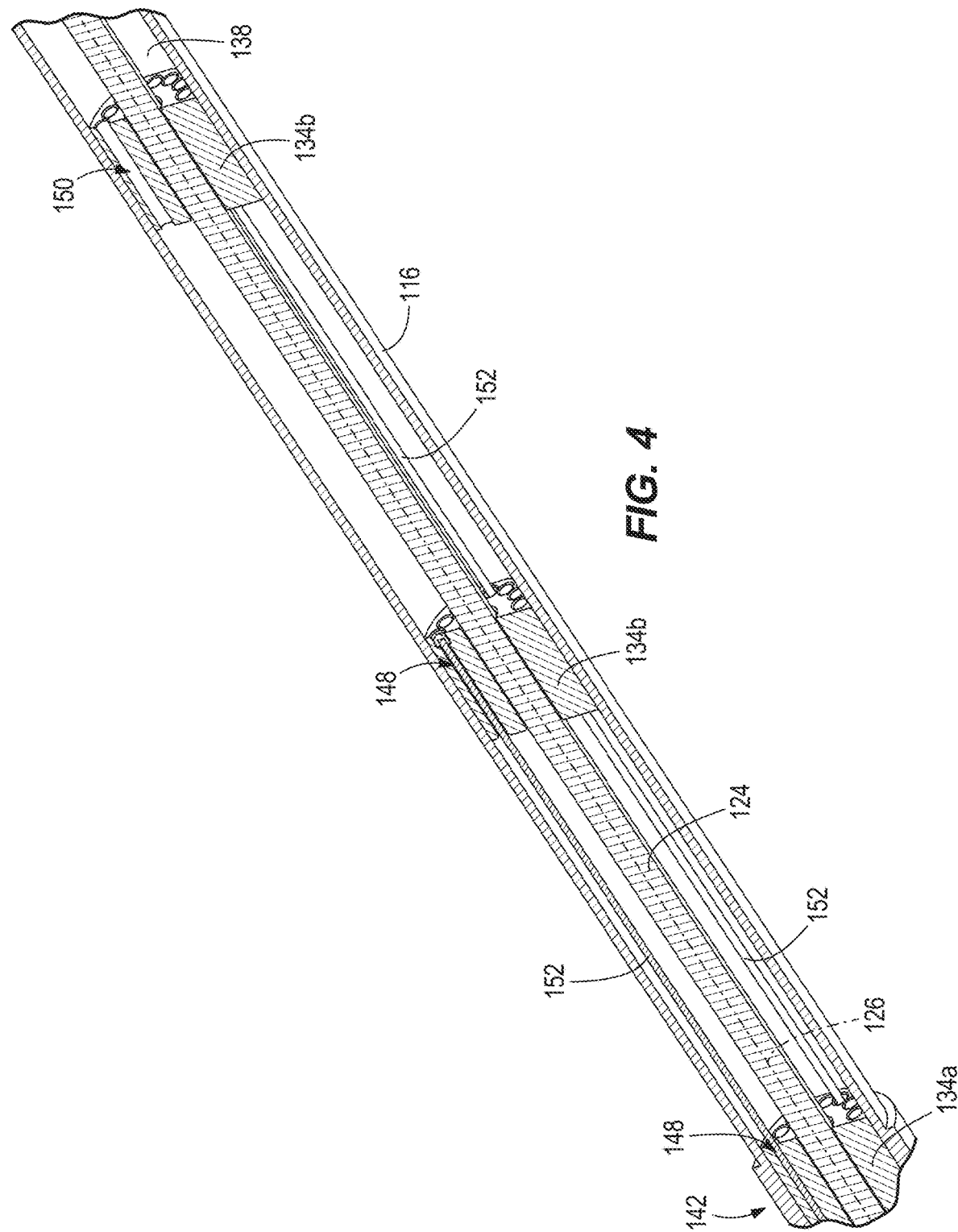
FIG. 4 is a detailed cross-sectional perspective view of the pole saw of FIG. 1 in the extended configuration.
Figure 5:
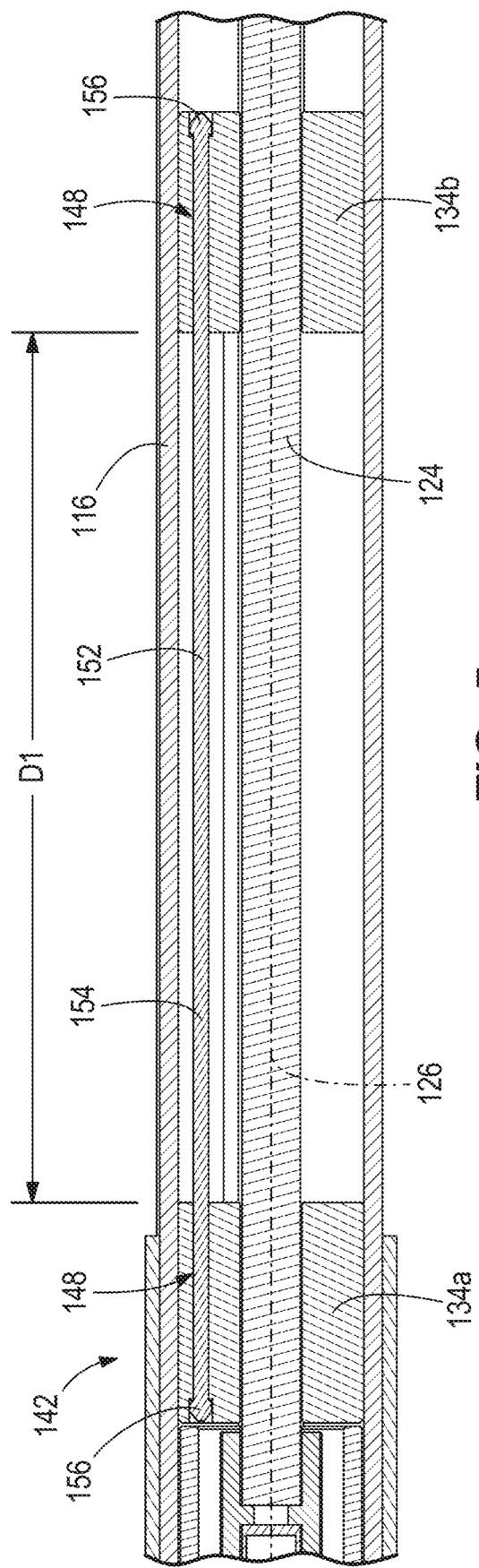
FIG. 5 is a cross-sectional elevation view of the pole saw of FIG. 1 in the extended configuration.

As shown in FIGS. 4-6, each bearing 134a, 134b, 134c further includes an end connection passage 148 defined therein. In the illustrated embodiment, the number of end connection passages 148 of a respective bearing 134a, 134b, 134c depends on the type of bearing 134a, 134b, 134c. Each of the end bearings 134a, 134c must connect to only one adjacent intermediate bearing 134c, for instance, while each intermediate bearing 134c must connect to two respective adjacent bearings 134a, 134b, 134c. In the illustrated embodiment, each of the end bearings 134a, 134c includes three connection passages 148, while each intermediate bearing 134b includes six end connection passages 148. In some embodiments, however, additional end connection passages 148 are defined in each of the end bearings 134a, 134c such that all the bearings 134a, 134b, 134c have the same number of end connection passages 148. Such embodiments could potentially reduce manufacturing costs, even if not all of the end connection passages 148 are utilized in the end bearings 134a, 134c.

Each bearing 134a, 134b, 134c also includes a transit passage 150 defined therein. In the illustrated embodiment, the number of transit passages 150 of a respective bearing 134a, 134b, 134c also depends on the type of bearing 134a, 134b, 134c. Each of the end bearings 134a, 134c includes more transit passages 150 than an intermediate bearing 134b.

The number of connection passages 148 and transit passages 150 in each of the bearings 134a, 134b, 134c can be different from that shown in other embodiments. The number of connection passages 148 and transit passages in each bearing 134a, 134b, 134c can depend on the number of bearings 134a, 134b, 134c in the bearing assembly 132.

The bearing assembly 132 further includes at least one connection member 152 connecting a first bearing 134a, 134b, 134c to an adjacent second bearing 134a, 134b, 134c. In the illustrated embodiment, each bearing 134a, 134b, 134c is connected to an adjacent bearing 134a, 134b, 134c by three connection members 152. Other embodiments may include one, two, four, or more connection members 152. Embodiments including more than two connection members 152 may help prevent unwanted motion of the bearings 134a, 134b, 134c inside the outer pole 116 and may also aid in maintaining alignment of the bearings 134a, 134b, 134c. In some embodiments, the connection members 152 are electrically insulative connection members, or dielectric connection members, 152. The connection members 152 are made of an electrically insulative material, such as fiberglass and resin, a plastic or other polymer, or the like.

Figure 7:
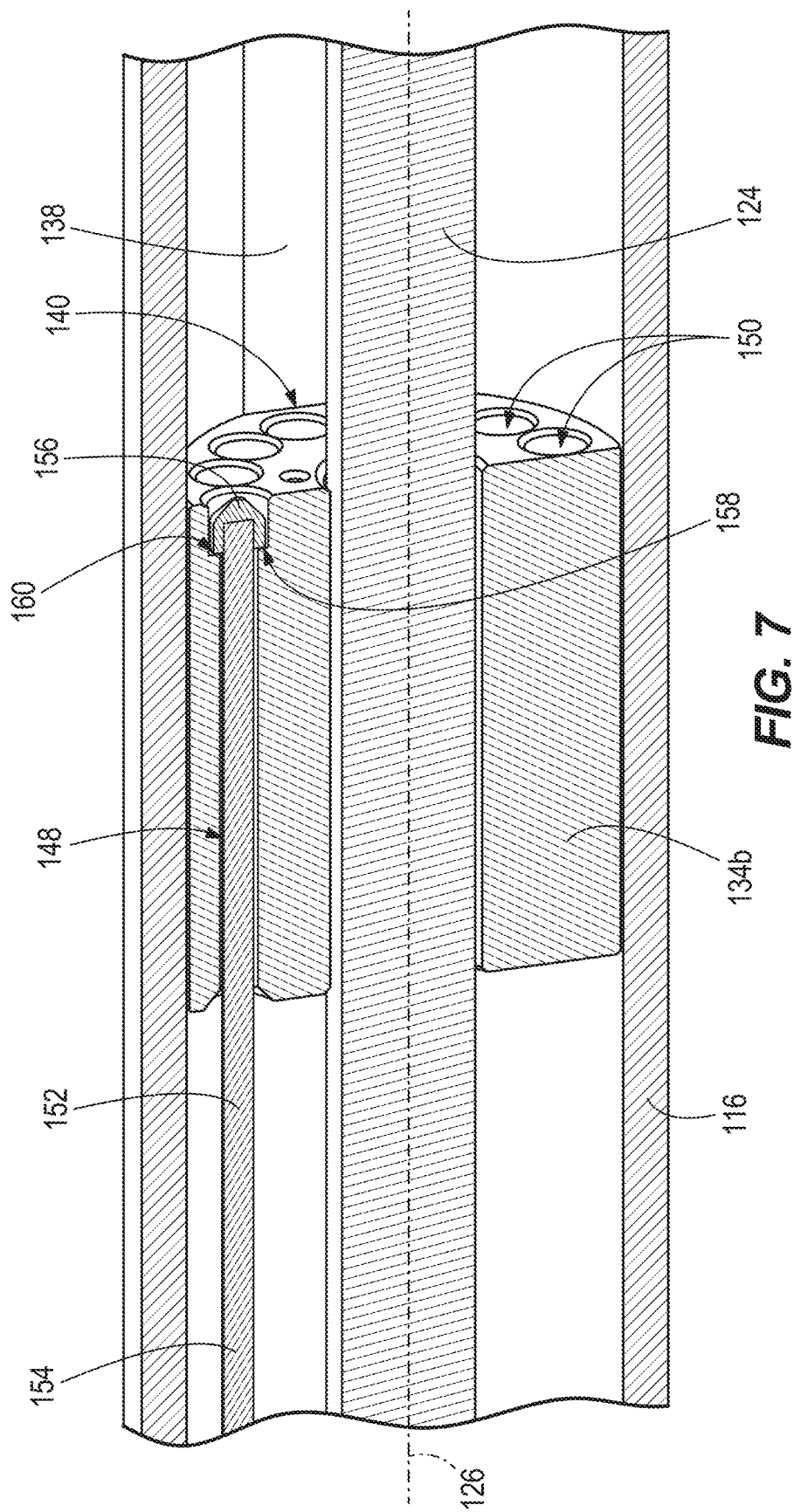
FIG. 7 is a detailed cross-sectional perspective view of the pole saw of FIG. 1 in the extended configuration.

As shown in FIG. 5, for instance, the connection members 152 are illustrated as elongate members having an elongate shaft portion 154 and end portions 156. The end portions 156 are wider than the elongate shaft portions 154. In some embodiments, the end portions 156 are separate components from the elongate shaft portion 154. The end portions 156 may be press fit onto the elongate shaft portion 154, threaded onto the elongate shaft portion 154, fixed thereto with adhesive, or the like. In the illustrated embodiment, the end portions 156 of the connection members 152 are pointed with a rounded (instead of sharp) tip. Other embodiments include the end portions 156 being frustoconical, rounded, hemispherical, or the like. As shown in FIG. 7, for instance, the end portions 156 include a shoulder 158. The shoulder 158 can be a flat surface as shown, but some embodiments include a chamfered or rounded shoulder.

Adjacent bearings 134a, 134b, 134c are connected by the connection members 152. A given connection member 152 may be fixedly connected to the one bearing 134a, 134b, 134c and slidably connected to the respective adjacent bearing 134a, 134b, 134c. In some embodiments, the connection member 152 is slidably connected to both of the adjacent bearings 134a, 134b, 134c. The bearings 134a, 134b, 134c are slidably connected to each other by the connection members 152.

No matter the configuration of the telescoping tool 100, each connection member 152 occupies two respective end connection passages 148 (one end connection passage 148 of each of adjacent respective bearings 134a, 134b, 134c). Stated another way, a first bearing 134a, 134b, 134c and a second bearing 134a, 134b, 134c each has a respective end connection passage 148. The end connection passage 148 of the first bearing 134a, 134b, 134c aligns with the end connection passage 148 of the second bearing 134a, 134b, 134c. A connection member 152 occupies both the end connection passage 148 of the first bearing 134a, 134b, 134c and the end connection passage 148 of the second bearing 134a, 134b, 134c. In the illustrated embodiment, the connection member 152 occupies these end connection passages 148 regardless of the position or configuration of the telescoping tool 100.

Each bearing 134a, 134b, 134c includes an end portion receiving face 160 (shown in FIG. 7, for instance) that interacts with the shoulder 158 of the end portion 156. This end portion receiving face 160 may be flush with the end of the respective bearing 134a, 134b, 134c, but is illustrated as a recessed end portion receiving face 160. The recessed end portion receiving face 160 allows the bearing assembly 132 to collapse further when the telescoping tool 100 is in the retracted position (FIG. 1). The shoulder 158 and the end portion receiving face 160 contact each other to prevent removal of the connection member 152 from the respective end connection passage 148 of the respective bearing 134a, 134b, 134c. In the illustrated embodiment, the end portion receiving face 160 interacts with the shoulder 158 due to the end connection passage 148 being narrower in diameter than the end portion 156 of the connection member 152. The relatively tight tolerance between the diameter of the elongate shaft portion 154 of the connection member 152 and the diameter of the end connection passage 148 further facilitates locating the connection member 152 within the bearing 134a, 134b, 134c.

With the end portion receiving face 160 and the shoulder 158 of the end portion 156, the connection member 152 is free to slide relative to the respective bearing 134a, 134b, 134c, but cannot slide out of the end connection passage 148 of the respective bearing 134a, 134b, 134c entirely. This configuration allows the bearing assembly 132 to collapse down (FIG. 9F) for when the telescoping tool 100 is in the retracted configuration (FIG. 1). This configuration also allows the bearing assembly 132 to be limited in how far it can spread (FIG. 9A) for when the telescoping tool 100 is in the extended configuration (FIG. 2).

As shown in FIG. 4, each bearing 134a, 134b, 134c further includes at least one transit passage 150 defined therein. As stated above, the number of transit passages 150 defined in each bearing 134a, 134b, 134c depends on the type of bearing 134a, 134b, 134c and the number of bearings 134a, 134b, 134c in the bearing assembly 132. In the illustrated embodiment, for instance, the bearing assembly 132 includes a proximal end bearing 134a, four intermediate bearings 134b, and a distal end bearing 134c. In the illustrated embodiment, each of the proximal end bearing 134a and the distal end bearing 134c includes twelve transit passages 150 defined therein. In the illustrated embodiment, each intermediate bearing 134b includes nine transit passages 150 defined therein.

Each of the transit passages 150 of each bearing 134a, 134b, 134c are selectively occupied by a respective connection member 152. Stated another way, the transit passages 150 of the bearings 134a, 134b, 134c are unoccupied with the telescoping tool 100 in the extended configuration (FIG. 2). Each transit passage 150 allows a respective connection member 152 to at least partially pass therethrough. Stated another way, the transit passage 150 of each bearing 134a, 134b, 134c is wide enough to slidably receive the end portion 156 of the respective connection member 152 at least partially therethrough. The transit passages 150 in each of the end bearings 134a, 134c are illustrated as through holes, but other embodiments may include a closed end of the transit passages 150 in the end bearings 134a, 134c. As shown in FIG. 8, the open ends of the transit passages 150 include a chamfered transition face 162 to aid insertion of the end portion 156 of the respective connection members 152. In other embodiments, the transition can instead be rounded.

As shown in FIGS. 9A-9F, the bearing assembly 132 can include two or more bearings 134a, 134b, 134c. In the illustrated embodiment, the bearing assembly 132 includes six bearings 134a, 134b, 134c. Other embodiments could include three, four, five, seven, or more bearings 134a, 134b, 134c. The end bearings 134a, 134c may be of a different construction from the intermediate bearings 134b, or they may be the same.

Although the illustrated embodiment includes the intermediate bearings 134b all having the same number of end connection passages 148 and transit passages 150, other embodiments may include the intermediate bearings 134b having varying numbers of transit passages 150, for instance. The bearings 134a, 134b, 134c could proceed with increasing numbers of transit passages 150.

Assembling the bearing assembly 132 can be facilitated by inclusion of markings 164, such as the dimples shown in FIG. 8. A user assembling the bearing assembly 132 can match the bearings 134a, 134b, 134c up to each other with the same connection member 152 by referring to the markings 164 to make sure a given connection member 152 is adjacent a desired marking 164.

Although particular embodiments have been shown and described, other alternative embodiments will become apparent to those skilled in the art and are within the intended scope of the independent aspects of the disclosure. Various features of the disclosure are set forth in the following claims.

What is claimed is:

1. A telescoping tool comprising:
   a pole assembly including an outer pole and an inner pole slidably received in the outer pole, the pole assembly movable between a retracted configuration and an extended configuration;
   a driveshaft extending longitudinally in the outer pole and the inner pole;
   a plurality of bearings, each bearing including
      a driveshaft passage defined in the bearing, the driveshaft passage receiving the driveshaft therethrough, and
      an end connection passage defined in the bearing; and
   at least one connection member joining adjacent bearings of the plurality of bearings, the connection member disposed in the end connection passage of each of the adjacent bearings.

2. The telescoping tool of claim 1, wherein the driveshaft passage and the end connection passage are defined as through passages in each bearing.

3. The telescoping tool of claim 1, wherein each bearing includes a first end and a second end, and wherein the driveshaft passage and the end connection passage each extend through the bearing between the first end and the second end.

4. The telescoping tool of claim 3, wherein the driveshaft passage extends centrally through the bearing.

5. The telescoping tool of claim 4, wherein each bearing includes an outer surface configured to engage with the outer pole, and wherein the end connection passage is defined in the bearing between the driveshaft passage and the outer surface.

6. The telescoping tool of claim 4, wherein the end connection passage is defined in the bearing at a position circumferentially offset the driveshaft passage.

7. The telescoping tool of claim 1, wherein the bearings include bushings made of an electrically insulative material.

8. The telescoping tool of claim 1, wherein the driveshaft is made of an electrically insulative material.

9. The telescoping tool of claim 1, wherein
   each connection member includes an end portion and an elongate shaft portion, the end portion being wider than the elongate shaft portion, and
   the end connection passage is narrower than the end portion of the respective connection member.

10. The telescoping tool of claim 9, wherein
   at least one of the bearings includes a connection member transit passage defined in the bearing,
   the end connection passage of each bearing receives one of the connection members in both the retracted configuration and the extended configuration of the pole assembly, and
   the connection member transit passage of the at least one of the bearings is configured for selectively receiving another of the connection members.

11. The telescoping tool of claim 10, wherein the connection member transit passage of each intermediate bearing is wide enough to slidably receive the end portion of the respective connection member therethrough.

12. The telescoping tool of claim 1, wherein
   the plurality of bearings includes a distal end bearing, and
   the distal end bearing including an inner pole connection portion connected to the inner pole.

13. A telescoping tool comprising:
   a pole assembly including an outer pole and an inner pole slidably received in the outer pole, the pole assembly movable between a retracted configuration and an extended configuration;
   a driveshaft extending longitudinally in the outer pole and the inner pole;
   a first bearing defining a first driveshaft passage configured to receive the driveshaft therethrough and a first end connection passage defined as a through passage in the first bearing;
   a second bearing defining a second driveshaft passage defined in the bearing configured to receive the driveshaft therethrough and a second end connection passage defined as a through passage in the second bearing, the second end connection passage aligned with the first end connection passage; and
   at least one connection member joining adjacent bearings of the plurality of bearings, the connection member disposed in the first and second connection passages.

14. The telescoping tool of claim 13, wherein the first and second bearing includes an outer surface configured to engage with the outer pole, and wherein the first end connection passage is defined in the first bearing between the first driveshaft passage and the outer surface, and wherein the second end connection passage is defined in the second bearing between the second driveshaft passage and the outer surface.

15. The telescoping tool of claim 14, wherein the first and second end connection passages are defined in the first and second bearing at a position circumferentially offset the first and second driveshaft passage respectively.

16. The telescoping tool of claim 13, wherein the first and second bearings include bushings made of an electrically insulative material.

17. The telescoping tool of claim 13, wherein the driveshaft is made of an electrically insulative material.

18. The telescoping tool of claim 13, wherein
   each connection member includes an end portion and an elongate shaft portion, the end portion being wider than the elongate shaft portion, and
   the first and second end connection passages are narrower than the end portion of the respective connection member.

19. The telescoping tool of claim 18, wherein
   at least one of the first or second bearing includes a connection member transit passage defined in the bearing,
   the first and second end connection passage of the first and second bearing receives one of the connection members in both the retracted configuration and the extended configuration of the pole assembly, and
   the connection member transit passage of the at least one of the first or second bearings is configured for selectively receiving another of the connection members.

20. The telescoping tool of claim 13, wherein the first bearing is a distal end bearing including an inner pole connection portion connected to the inner pole, and wherein the second bearing is a proximal end bearing fixed adjacent a proximal end of the outer pole.

* * * * *